United States Patent
Kuwayama et al.

(10) Patent No.: US 12,210,354 B2
(45) Date of Patent: Jan. 28, 2025

(54) INFORMATION PROCESSING APPARATUS INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Yuki Kuwayama, Yokohama (JP); Takeshi Fujiki, Tokyo (JP); Rie Murai, Chiba (JP); Kohei Miwa, Sunto-gun (JP); Akira Miyamoto, Nissin (JP); Tsuyoshi Okada, Nagoya (JP); Yu Ito, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 18/077,583

(22) Filed: Dec. 8, 2022

(65) Prior Publication Data

US 2023/0244245 A1 Aug. 3, 2023

(30) Foreign Application Priority Data

Jan. 31, 2022 (JP) .................. 2022-013632

(51) Int. Cl.
*G05D 1/00* (2024.01)
*B60W 60/00* (2020.01)

(52) U.S. Cl.
CPC ......... *G05D 1/0295* (2013.01); *B60W 60/001* (2020.02)

(58) Field of Classification Search
None
See application file for complete search history.

(56) References Cited

U.S. PATENT DOCUMENTS

| | | | |
|---|---|---|---|
| 2017/0269594 A1* | 9/2017 | Sydnor | G05D 1/0011 |
| 2017/0318732 A1* | 11/2017 | Yamashita | G05D 1/02 |
| 2020/0057453 A1* | 2/2020 | Laws | G05D 1/0088 |
| 2020/0164980 A1* | 5/2020 | Sudou | G08G 1/205 |
| 2021/0134163 A1* | 5/2021 | Wissler | G08G 5/0069 |
| 2021/0284158 A1 | 9/2021 | Koike et al. | |
| 2022/0291695 A1* | 9/2022 | Hatori | G08G 1/202 |
| 2023/0083514 A1* | 3/2023 | Nishibeppu | G05D 1/2232 |
| | | | 701/50 |
| 2023/0244245 A1* | 8/2023 | Kuwayama | G05D 1/0295 |
| | | | 701/23 |

FOREIGN PATENT DOCUMENTS

| | | |
|---|---|---|
| JP | 2019-170228 A | 10/2019 |
| JP | 6692567 B1 | 5/2020 |
| JP | 2021-142905 A | 9/2021 |
| JP | 2021-153421 A | 10/2021 |

\* cited by examiner

*Primary Examiner* — Daniel L Greene
(74) *Attorney, Agent, or Firm* — Oliff PLC

(57) ABSTRACT

A processor included in an information processing apparatus is configured to generate a follow-up command to perform follow-up travel to follow an autonomous vehicle with an autonomous driving function or an unmanned aircraft. The processor is configured to send the follow-up command to a work vehicle with a follow-up travel function.

12 Claims, 6 Drawing Sheets

INFORMATION PROCESSING APPARATUS INFORMATION PROCESSING METHOD, AND NON-TRANSITORY STORAGE MEDIUM

CROSS-REFERENCE TO RELATED APPLICATION

This application claims priority to Japanese Patent Application No. 2022-013632 filed on Jan. 31, 2022, incorporated herein by reference in its entirety.

BACKGROUND

1. Technical Field

The disclosure relates to an information processing apparatus, an information processing method, and a non-transitory storage medium.

2. Description of Related Art

Japanese Unexamined Patent Application Publication No. 2021-153421 (JP 2021-153421 A) describes a work vehicle with an automatic steering function.

SUMMARY

There is room for improvement in the technology to autonomously drive a work vehicle on public roads.

The disclosure provides an improved technology to autonomously drive a work vehicle on public roads.

A first aspect of the disclosure provides an information processing apparatus that includes a processor. The processor is configured to generate a follow-up command to perform follow-up travel to follow an autonomous vehicle with an autonomous driving function or an unmanned aircraft, and is configured to send the follow-up command to a work vehicle with a follow-up travel function.

In the first aspect, the processor may be configured to detect whether an index indicating instability of the follow-up travel is greater than or equal to a predetermined threshold, and the processor may be configured to send a first stop command or a second stop command to the work vehicle when the processor detects that the index is greater than or equal to the predetermined threshold. The first stop command may be a command to stop the work vehicle at a current location. The second stop command may be a command to stop the work vehicle after driving the work vehicle in limp home mode.

In the first aspect, the processor may be configured to send a first stop command to the work vehicle when the processor determines that an obstacle is present around the work vehicle. The first stop command may be a command to stop the work vehicle at a current location.

In the first aspect, the processor may be configured to determine whether the obstacle is present based on surroundings information acquired by the work vehicle.

In the first aspect, the processor may be configured to send the follow-up command again to the work vehicle after a predetermined period lapses from a time that the work vehicle stops.

In the first aspect, the processor may be configured to control notifying an area around the work vehicle that the work vehicle is performing follow-up travel.

In the first aspect, the processor may be configured to select a travel route of the autonomous vehicle or a flight route of the unmanned aircraft based on a size of the work vehicle.

A second aspect of the disclosure is an information processing method to be executed by an information processing apparatus. The information processing method includes generating a follow-up command to perform follow-up travel to follow an autonomous vehicle with an autonomous driving function or an unmanned aircraft, and sending the follow-up command to a work vehicle with a follow-up travel function.

In the second aspect, the information processing method may further include sending a first stop command or a second stop command to the work vehicle when an index indicating that instability of the follow-up travel is greater than or equal to a predetermined threshold is detected. The first stop command may be a command to stop the work vehicle at a current location. The second stop command may be a command to stop the work vehicle after driving the work vehicle in limp home mode.

In the second aspect, the information processing method may further include sending a first stop command to the work vehicle when the processor determines that there is an obstacle around the work vehicle. The first stop command may be a command to stop the work vehicle at a current location.

In the second aspect, the information processing method may further include determining whether the obstacle is present based on surroundings information acquired by the work vehicle.

In the second aspect, the information processing method may further include sending the follow-up command again to the work vehicle after a predetermined period lapses from a time that the work vehicle stops.

In the second aspect, the information processing method may further include controlling notifying an area around the work vehicle that the work vehicle is performing follow-up travel.

In the second aspect, the information processing method may further include selecting a travel route of the autonomous vehicle or a flight route of the unmanned aircraft based on a size of the work vehicle.

A third aspect of the disclosure provides a non-transitory storage medium storing instructions that are executable on one or more processors in a computer and that cause the one or more processors to perform functions. The functions include generating a follow-up command to perform follow-up travel to follow an autonomous vehicle with an autonomous driving function or an unmanned aircraft, and sending the follow-up command to a work vehicle with a follow-up travel function.

In the third aspect, the functions may further include sending a first stop command or a second stop command to the work vehicle when an index indicating instability of the follow-up travel is greater than or equal to a predetermined threshold is detected. The first stop command may be a command to stop the work vehicle at a current location. The second stop command may be a command to stop the work vehicle after driving the work vehicle in limp home mode.

In the third aspect, the functions may further include sending a first stop command to the work vehicle when an obstacle being present around the work vehicle is determined. The first stop command may be a command to stop the work vehicle at a current location.

In the third aspect, the functions may further include determining whether the obstacle is present based on surroundings information acquired by the work vehicle.

In the third aspect, the functions may further include sending the follow-up command again to the work vehicle after a predetermined period lapses from a time that the work vehicle stops.

In the third aspect, the functions may further include controlling notifying an area around the work vehicle that the work vehicle is performing follow-up travel.

With the first aspect, the second aspect, and the third aspect of the disclosure, it is possible to improve a technology to autonomously drive a work vehicle on public roads.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described.

Figure 1:
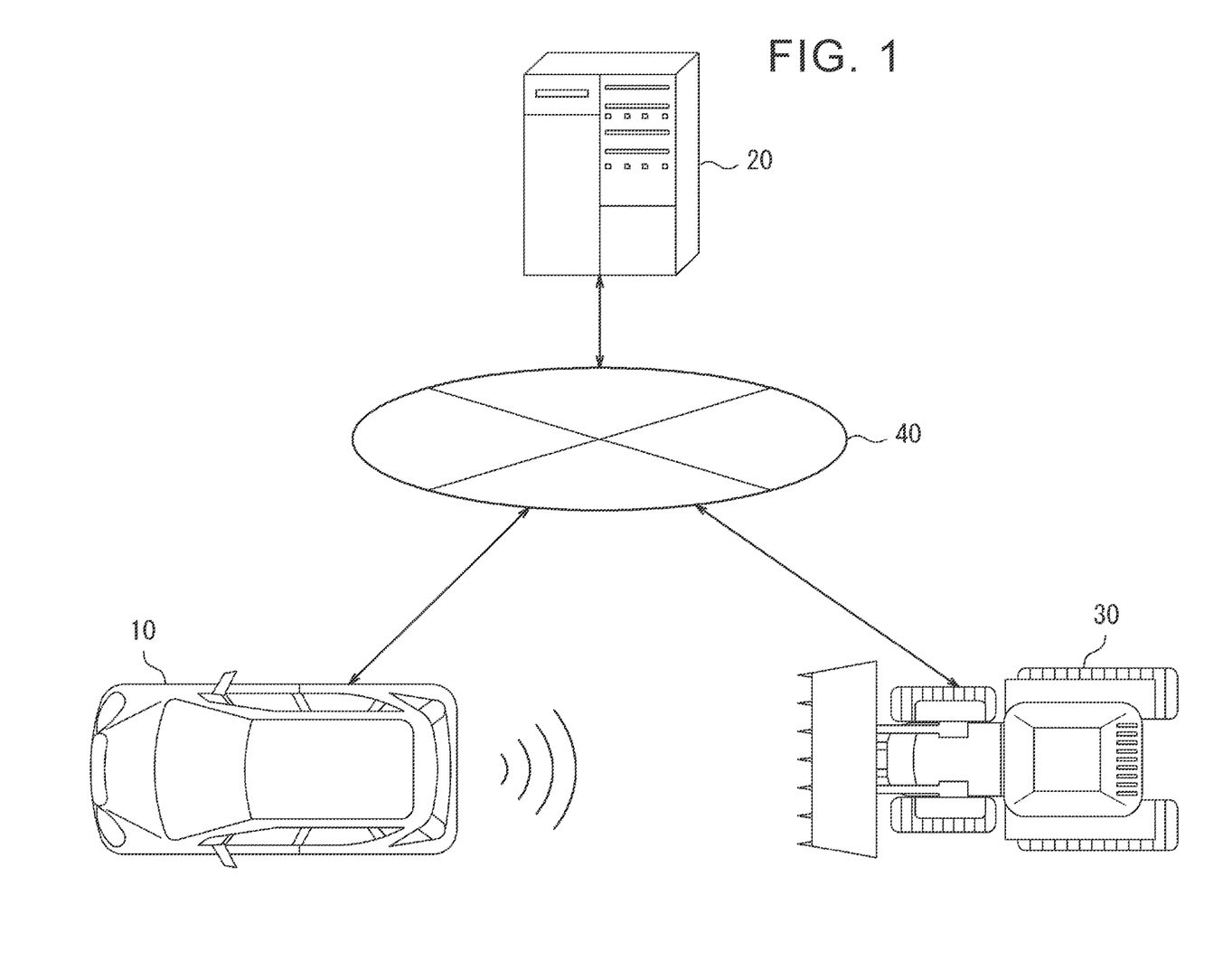
FIG. 1 is a block diagram showing the schematic configuration of a system according to an embodiment of the disclosure.

The outline of a system 1 according to the embodiment of the disclosure will be described with reference to FIG. 1.

The system 1 includes a vehicle 10, an information processing apparatus 20, and a work vehicle 30. The vehicle 10, the information processing apparatus 20, and the work vehicle 30 are connected to a network 40 such that communication is possible.

The vehicle 10 is an ordinary vehicle, such as a vehicle with an autonomous driving function that provides autonomous driving at a selected level. Examples of the vehicle include a gasoline vehicle, a battery electric vehicle (BEV), a hybrid electric vehicle (HEV), a plug-in hybrid electric vehicle (PHEV), and a fuel cell electric vehicle (FCEV); however, the vehicle is not limited thereto.

The information processing apparatus 20 is a computer, such as a server that belongs to a cloud computing system or another computing system; however, the information processing apparatus 20 is not limited thereto.

The work vehicle 30 is a vehicle with a follow-up travel function and is capable of autonomously traveling and following the vehicle 10 while keeping an inter-vehicle distance from the vehicle 10 (leading vehicle) at a predetermined value. The work vehicle 30 is, for example, an agricultural machinery, such as a tractor, a rice planting machine, and a combined harvester and thresher; however, the work vehicle 30 is not limited thereto. The number of work vehicles 30 may be selectively determined.

The network 40 includes the Internet, at least one wide area network (WAN), at least one metropolitan area network (MAN), or any combination of them. The network 40 may include at least one wireless network, at least one optical network, or a combination of them. Examples of the wireless network include an ad hoc network, a cellular network, a wireless local area network (LAN), a satellite communication network, and a terrestrial microwave network.

The outline of the present embodiment will be described with reference to FIG. 1.

A control unit 21 of the information processing apparatus 20 generates a follow-up command to perform follow-up travel to follow the vehicle 10 with an autonomous driving function. The control unit 21 of the information processing apparatus 20 sends the follow-up command to the work vehicle 30 with a follow-up travel function via a communication unit 22.

Here, to cut labor costs, it is desired to autonomously drive the work vehicle 30 even on public roads or the like other than private roads, farm lands, or the like. On the other hand, if not only various sensors subjected to farm work and provided in the work vehicle 30 but also various sensors used for autonomous travel on public roads or the like are further provided in the work vehicle 30 to autonomously drive the work vehicle 30 on public roads or the like, the selling price of the work vehicle 30 increases. According to the present embodiment, by causing the work vehicle 30 to perform follow-up travel to follow the vehicle 10 with an autonomous driving function, it is possible to cut labor costs and suppress an increase in the selling price of the work vehicle 30. Therefore, it is possible to improve the technology to autonomously drive the work vehicle 30 on public roads.

Figure 2:
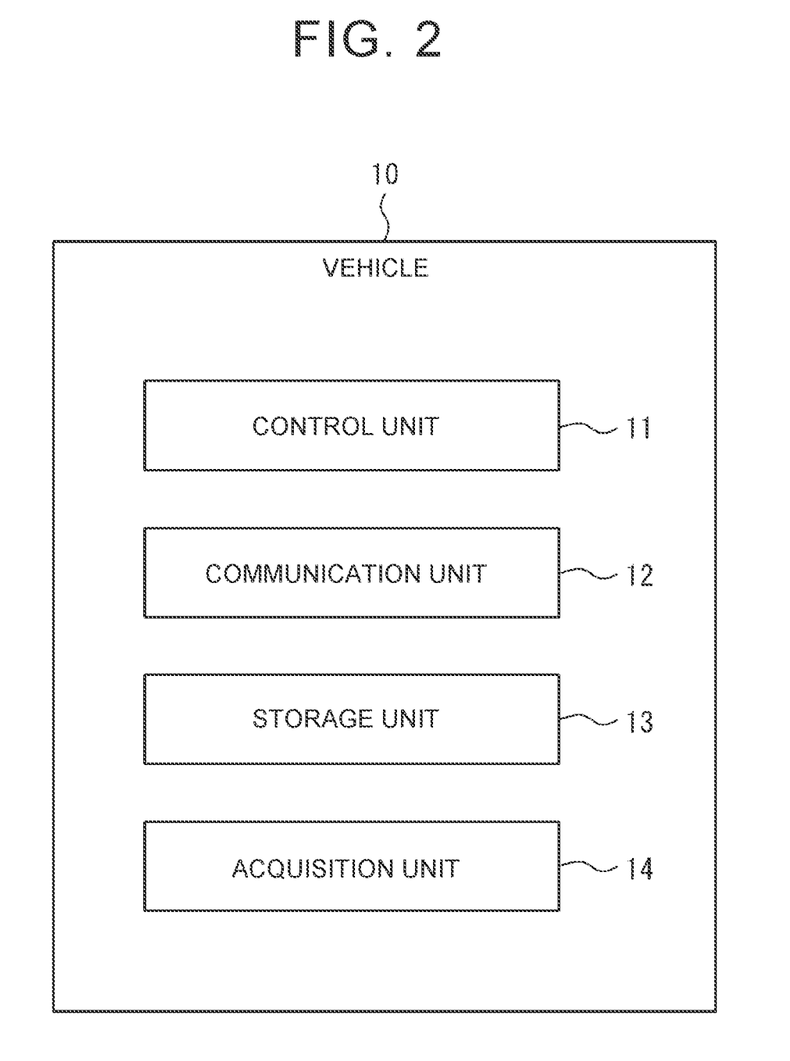
FIG. 2 is a block diagram showing the schematic configuration of a vehicle according to the embodiment of the disclosure.

The configuration of the vehicle 10 according to the present embodiment will be described with reference to FIG. 2.

The vehicle 10 includes a control unit 11, a communication unit 12, a storage unit 13, and an acquisition unit 14.

The control unit 11 includes at least one processor, at least one programmable circuit, at least one dedicated circuit, or any combination of them. The processor is a general-purpose processor, such as a central processing unit (CPU) and a graphics processing unit (GPU), or a special-purpose processor specialized in a specific process. The programmable circuit is, for example, a field-programmable gate array (FPGA). The dedicated circuit is, for example, an application specific integrated circuit (ASIC). The control unit 11 realizes autonomous driving of the vehicle 10 in cooperation with the acquisition unit 14. Specifically, the control unit 11 executes steering control, accelerator control, brake control, and the like of the vehicle 10 by using information acquired by the acquisition unit 14. Examples of autonomous driving include level 1 autonomous driving to level 5 autonomous driving, defined in Society of Automotive Engineers (SAE); however, autonomous driving is not limited thereto. Autonomous driving may be defined as needed.

The communication unit 12 includes one or more communication interfaces for connection with the network 40. The communication interface supports, for example, a mobile communication standard, such as 4th Generation (4G) and 5th Generation (5G); however, the communication interface is not limited thereto. The communication unit 12 receives data used in the operation of the vehicle 10 and sends data obtained through the operation of the vehicle 10.

The storage unit 13 includes at least one semiconductor memory, at least one magnetic memory, at least one optical memory, or any combination of them. The semiconductor memory is, for example, a random access memory (RAM) or a read only memory (ROM). The RAM is, for example, a static random access memory (SRAM) or a dynamic random access memory (DRAM). The ROM is, for example, an electrically erasable programmable read only memory (EEPROM). The storage unit 13 may function as, for example, a main storage device, an auxiliary storage device, or a cache memory. The storage unit 13 stores selected information used in autonomous driving of the vehicle 10.

The acquisition unit 14 includes one or more sensor modules. The sensor module is, for example, a speed sensor, an acceleration sensor, an angular velocity sensor, light detection and ranging or laser imaging detection and ranging (LIDAR), a steering angle sensor, or the like; however, the configuration is not limited thereto. The sensor module acquires travel information of the vehicle 10. The acquisition unit 14 includes one or more positioning modules. The positioning module is a positioning module or the like that supports, for example, a global positioning system (GPS), a quasi-zenith satellite system (QZSS), a global navigation satellite system (GLONASS), or Galileo; however, the positioning module is not limited thereto. The positioning module acquires location information of the vehicle 10.

Figure 3:
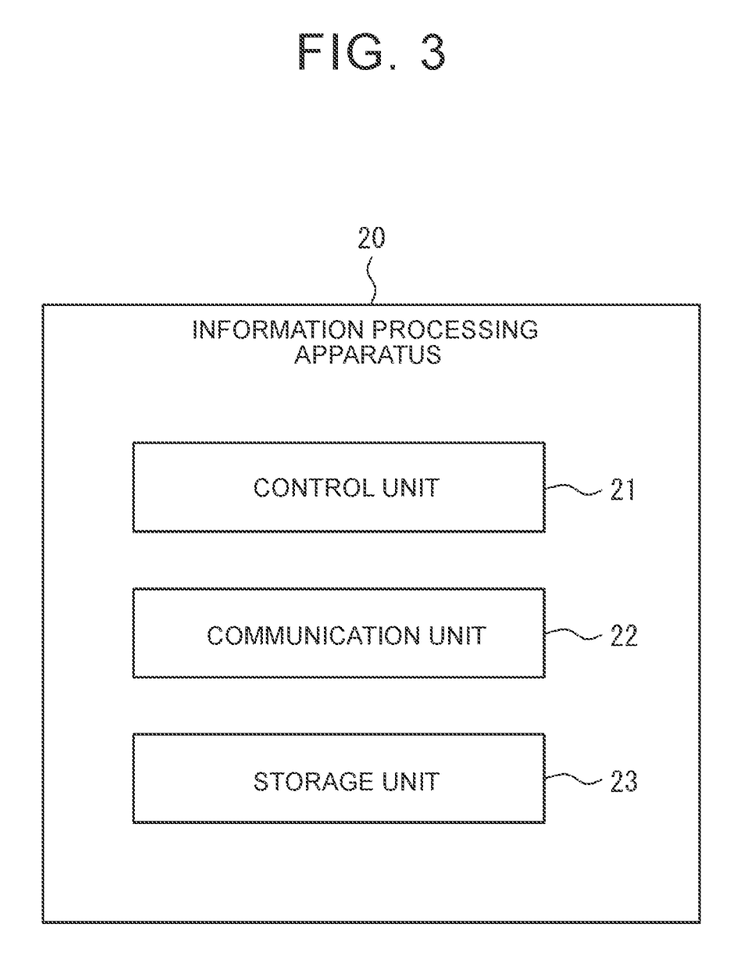
FIG. 3 is a block diagram showing the schematic configuration of an information processing apparatus according to the embodiment of the disclosure.

The configuration of the information processing apparatus 20 according to the present embodiment will be described with reference to FIG. 3.

The information processing apparatus 20 includes the control unit 21, the communication unit 22, and a storage unit 23.

The control unit 21 includes at least one processor, at least one programmable circuit, at least one dedicated circuit, or any combination of them. The processor is, for example, a general-purpose processor, such as a CPU and a GPU, or a special-purpose processor specialized in a specific process. The programmable circuit is, for example, an FPGA. The dedicated circuit is, for example, an ASIC. The control unit 21 executes a process related to the operation of the information processing apparatus 20 while controlling the units of the information processing apparatus 20.

The communication unit 22 includes at least one communication interface for connection with the network 40. The communication interface supports, for example, a mobile communication standard, a wired LAN standard, or a wireless LAN standard; however, the standard supported by the communication interface is not limited thereto. The communication interface may support a selected communication standard. The communication unit 22 receives data used in the operation of the information processing apparatus 20 and sends data obtained through the operation of the information processing apparatus 20.

The storage unit 23 includes at least one semiconductor memory, at least one magnetic memory, at least one optical memory, or any combination of them. The semiconductor memory is, for example, a RAM or a ROM. The RAM is, for example, an SRAM or a DRAM. The ROM is, for example, an EEPROM. The storage unit 23 may function as, for example, a main storage device, an auxiliary storage device, or a cache memory. The storage unit 23 stores data used in the operation of the information processing apparatus 20 and data obtained through the operation of the information processing apparatus 20. In the present embodiment, data used in the operation of the information processing apparatus 20 includes a system program, an application program, a database, map information, and the like.

Figure 4:
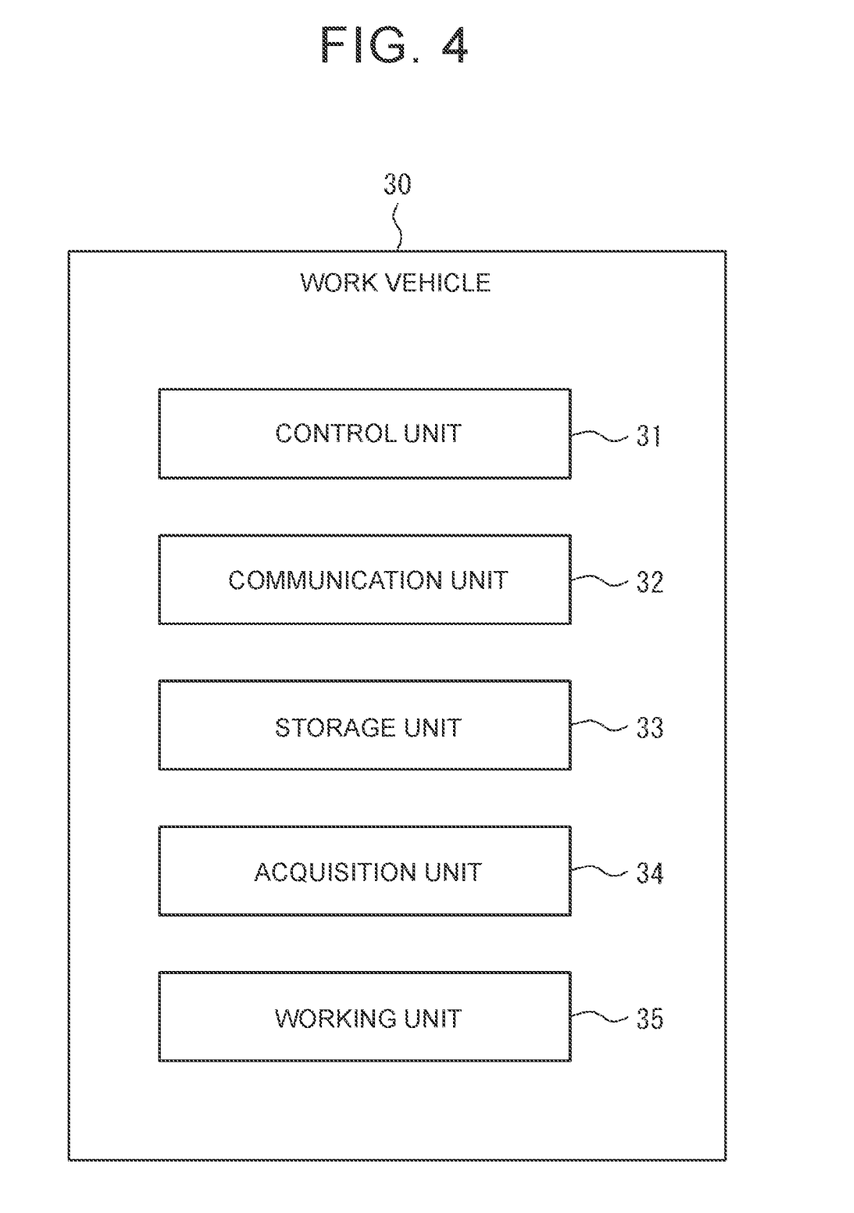
FIG. 4 is a block diagram showing the schematic configuration of a work vehicle according to the embodiment of the disclosure.

The configuration of the work vehicle 30 according to the present embodiment will be described with reference to FIG. 4.

The work vehicle 30 includes a control unit 31, a communication unit 32, a storage unit 33, an acquisition unit 34, and a working unit 35.

The control unit 31 includes at least one processor, at least one programmable circuit, at least one dedicated circuit, or any combination of them. The processor is, for example, a general-purpose processor, such as a CPU and a GPU, or a special-purpose processor specialized in a specific process. The programmable circuit is, for example, an FPGA. The dedicated circuit is, for example, an ASIC. The control unit 31 realizes follow-up travel to follow the vehicle 10 based on a follow-up command received from the information processing apparatus 20 via the communication unit 32. Specifically, the control unit 31 executes steering control, accelerator control, brake control, and the like of the work vehicle 30 based on the follow-up command. The control unit 31 is capable of realizing autonomous driving of the work vehicle 30 in an area other than public roads (for example, private roads, farm lands, or the like) in cooperation with the acquisition unit 34.

The communication unit 32 includes one or more communication interfaces for connection with the network 40. The communication interface supports, for example, a mobile communication standard, such as 4G and 5G; however, the communication interface is not limited thereto. The communication unit 32 receives data used in the operation of the work vehicle 30 and sends data obtained through the operation of the work vehicle 30.

The storage unit 33 includes at least one semiconductor memory, at least one magnetic memory, at least one optical memory, or any combination of them. The semiconductor memory is, for example, a RAM or a ROM. The RAM is, for example, an SRAM or a DRAM. The ROM is, for example, an EEPROM. The storage unit 33 may function as, for example, a main storage device, an auxiliary storage device, or a cache memory. The storage unit 33 stores selected information used in follow-up travel and autonomous driving of the work vehicle 30.

The acquisition unit 34 includes one or more sensor modules. The sensor module is, for example, a speed sensor, an acceleration sensor, an angular velocity sensor, a steering angle sensor, a camera used for farm work, or the like; however, the sensor module is not limited thereto. The sensor module acquires information used for autonomous driving of the work vehicle 30 in an area other than public roads. The acquisition unit 34 includes one or more positioning modules. The positioning module is a positioning module or the like that supports, for example, a global positioning system (GPS), a quasi-zenith satellite system (QZSS), a global navigation satellite system (GLONASS), or Galileo; however, the positioning module is not limited thereto. The positioning module acquires location information of the work vehicle 30.

The working unit 35 includes one or more working devices for performing farm work or the like. Examples of the working device include a sparging device that sparges fertilizer, pesticide, or the like, a sowing device that sows seeds in a field, and a harvesting device that harvests crops or the like; however, the working device is not limited thereto. The working unit 35 is able to be driven by electric power or the like supplied from the work vehicle 30.

Figure 5:
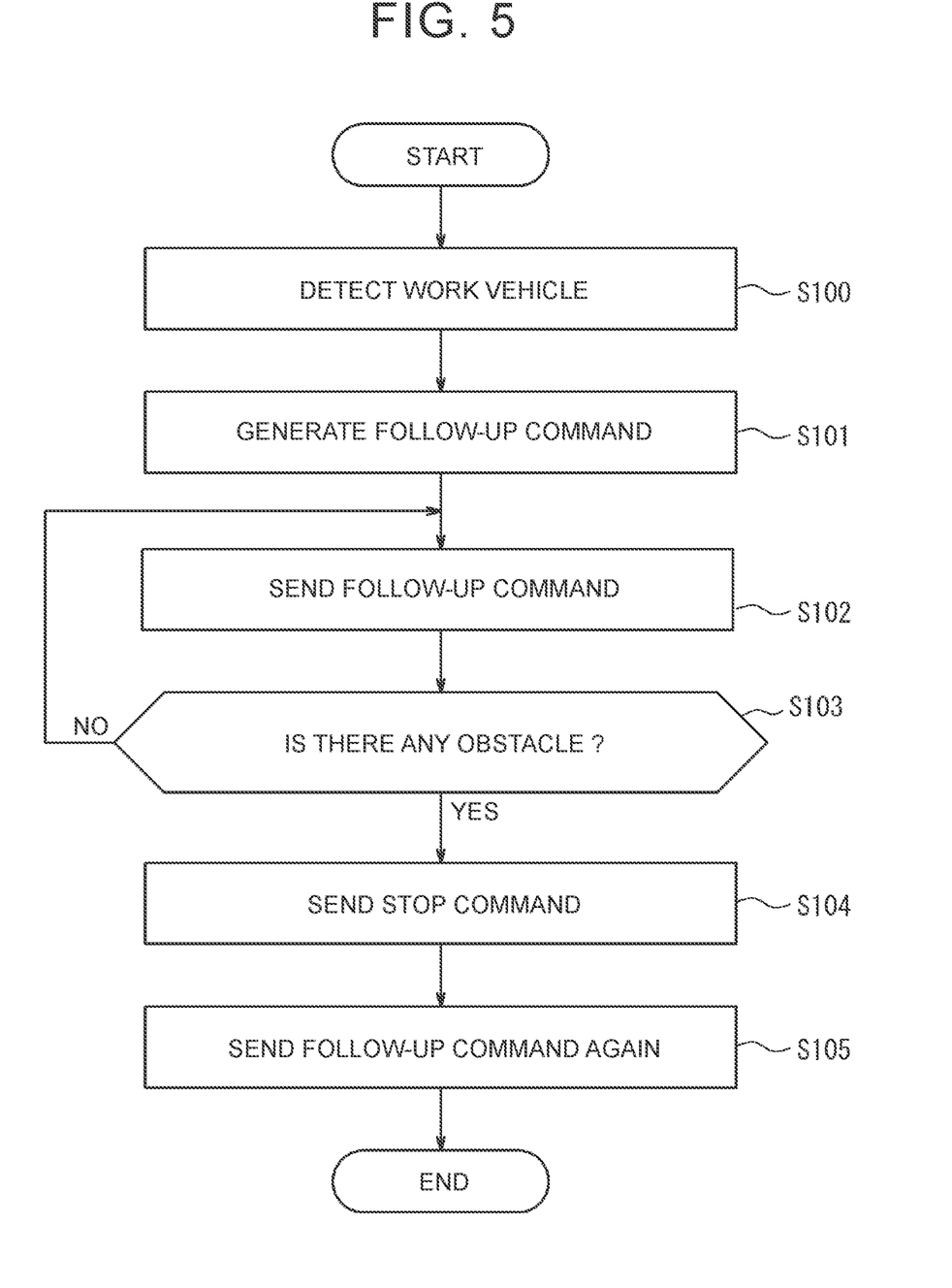
FIG. 5 is a flowchart showing the operation of the information processing apparatus according to the embodiment of the disclosure.

The operation of the information processing apparatus 20 according to the present embodiment will be described with reference to FIG. 5. The operation corresponds to a method according to one embodiment of the disclosure.

In the present embodiment, the vehicle 10 is an ordinary vehicle capable of performing unmanned autonomous driving (for example, level 5 autonomous driving defined in SAE), and the description will be made on the assumption that the vehicle 10 is autonomously driven along a travel route selected by a method (described later).

In step S100, the control unit 21 of the information processing apparatus 20 detects the work vehicle 30 to be caused to perform follow-up travel to follow the vehicle 10.

Specifically, the control unit 21 of the information processing apparatus 20 receives information about follow-up travel from, for example, a user terminal or the like, owned by a user of the work vehicle 30 via the communication unit 22. The control unit 21 of the information processing apparatus 20 detects the work vehicle 30 to be caused to perform follow-up travel to follow the vehicle 10 based on the received information about follow-up travel. The information about follow-up travel may include identification information (vehicle registration plate number or the like) of the work vehicle 30 to be caused to perform follow-up travel, the start date and time of follow-up travel, a departure place (for example, a user's farm), a destination (for example, a user's home), and the like; however, the information is not limited thereto.

In step S101, the control unit 21 of the information processing apparatus 20 generates a follow-up command to perform follow-up travel to follow the vehicle 10.

Specifically, the control unit 21 of the information processing apparatus 20 generates a follow-up command to perform follow-up travel to follow the vehicle 10 based on, for example, the map information stored in the storage unit 23 and the information about follow-up travel. The follow-up command includes a travel route, a travel vehicle speed, an acceleration, a deceleration, an inter-vehicle distance between the vehicle 10 and the work vehicle 30, and the like. When there are a plurality of work vehicles 30 to be caused to perform follow-up travel to follow the vehicle 10, the follow-up command may further include an inter-vehicle distance between the work vehicles 30. For example, the vehicle 10 may be used as a leading vehicle and the work vehicles 30, such as a mini-tractor and a harvesting agricultural machinery, may perform follow-up travel to follow the vehicle 10, for example, in this order.

Here, the control unit 21 of the information processing apparatus 20 may select a travel route of the vehicle 10 from a departure place (for example, user's farm) to a destination (for example, user's home), including public roads, based on the size of the work vehicle 30. For example, the control unit 21 of the information processing apparatus 20 selects the travel route of the vehicle 10 that the work vehicle 30 is able to perform follow-up travel, based on the length or width of the work vehicle 30, stored in the storage unit 23 in advance, and the widths of roads, acquired from the map information stored in the storage unit 23 in advance. The control unit 21 of the information processing apparatus 20 sends information indicating the selected travel route to the vehicle 10 via the communication unit 22. The control unit 11 of the vehicle 10 realizes autonomous driving of the vehicle 10 along the travel route in cooperation with the acquisition unit 14. The control unit 21 of the information processing apparatus 20 may further take the length or width of the vehicle 10 into consideration to select the travel route.

In step S102, the control unit 21 of the information processing apparatus 20 sends the follow-up command generated in step S101 to the work vehicle 30 detected in step S100 via the communication unit 22.

Specifically, the control unit 21 of the information processing apparatus 20 sends the follow-up command generated in step S101 to the work vehicle 30 detected in step S100 via the communication unit 22, for example, at predetermined time intervals during times when the work vehicle 30 leaves the departure place and reaches the destination. The control unit 31 of the work vehicle 30 realizes follow-up travel to follow the vehicle 10 by executing steering control, accelerator control, brake control, and the like of the work vehicle 30 based on the follow-up command each time the control unit 31 receives the follow-up command from the information processing apparatus 20 via the communication unit 32.

Here, the control unit 21 of the information processing apparatus 20 may execute control to provide notification to around the work vehicle 30 that the work vehicle 30 is performing follow-up travel. Specifically, the control unit 21 of the information processing apparatus 20 generates a selected message to provide notification that the work vehicle 30 is performing follow-up travel behind the vehicle 10. The control unit 21 of the information processing apparatus 20 sends the generated message to the vehicle 10 via the communication unit 22. Then, the control unit 11 of the vehicle 10 provides the message received from the information processing apparatus 20 via the communication unit 12 by voice to around the work vehicle 30 via, for example, a speaker or the like that can be mounted on the vehicle 10. When the vehicle 10 includes a selected projector capable of displaying an optical rope (also referred to as virtual rope) around the work vehicle 30, the control unit 21 of the information processing apparatus 20 may display a virtual rope around the work vehicle 30 with the projector. With this configuration, it is possible to avoid interruption of another vehicle into between the vehicle 10 and the work vehicle 30.

In step S103, the control unit 21 of the information processing apparatus 20 determines whether there is an obstacle around the work vehicle 30. When the control unit 21 determines that there is an obstacle, the process proceeds to step S104. On the other hand, when the control unit 21 does not determine that there is an obstacle, the process returns to step S102.

Specifically, the control unit 31 of the work vehicle 30 sends information around the work vehicle 30, acquired by the camera or the like used for farm work or the like and included in the acquisition unit 34, to the information processing apparatus 20 via the communication unit 32. The information around the work vehicle 30 may be image information of an obstacle, including a pedestrian, another vehicle, or the like present ahead in a traveling direction and that is likely to collide with the work vehicle 30; however, the information is not limited thereto. The control unit 21 of the information processing apparatus 20 acquires information around the work vehicle 30 from the work vehicle 30 via the communication unit 22. The control unit 21 of the information processing apparatus 20 determines whether there is an obstacle around the work vehicle 30 by using a selected image recognition technology based on the acquired information around the work vehicle 30.

In step S104, the control unit 21 of the information processing apparatus 20 sends a stop command to stop the work vehicle 30 at that location to the work vehicle 30 via the communication unit 22.

Specifically, the control unit 21 of the information processing apparatus 20 generates a stop command to stop the work vehicle 30 at a location where the work vehicle 30 is currently located. The control unit 21 of the information processing apparatus 20 sends the generated stop command to the work vehicle 30 via the communication unit 22. The control unit 31 of the work vehicle 30 stops the work vehicle 30 by controlling a brake pedal and the like of the work vehicle 30 based on the stop command received from the information processing apparatus 20 via the communication unit 32. Thus, the work vehicle 30 is able to avoid a collision with an obstacle.

In step S105, the control unit 21 of the information processing apparatus 20 sends again the follow-up command to perform follow-up travel to follow the vehicle 10 to the work vehicle 30 via the communication unit 22 after a lapse of a predetermined period of time from when the work vehicle 30 has stopped.

Specifically, the control unit 21 of the information processing apparatus 20 generates a follow-up command to perform follow-up travel to follow the vehicle 10 after a lapse of a predetermined period of time from when the work vehicle 30 has stopped as in the case of step S101. The control unit 21 of the information processing apparatus 20 sends again the generated follow-up command to the work vehicle 30 via the communication unit 22.

When the control unit 21 of the information processing apparatus 20 detects that the work vehicle 30 has reached the destination, the control unit 21 may stop the follow-up travel by sending a stop command to the work vehicle 30 via the communication unit 22.

As described above, the control unit 21 of the information processing apparatus 20 according to the present embodiment generates a follow-up command to perform follow-up travel to follow the vehicle 10 with an autonomous driving function. The control unit 21 of the information processing apparatus 20 sends the generated follow-up command to the work vehicle 30 with a follow-up travel function via the communication unit 22.

According to the present embodiment, by causing the work vehicle 30 to perform follow-up travel to follow the vehicle 10 with an autonomous driving function, a person does not need to operate the work vehicle 30 on public roads or the like, so it is possible to cut labor costs. According to the present embodiment, a sensor used for autonomous driving on public roads or the like does not need to be mounted on the work vehicle 30, so it is possible to suppress an increase in the selling price of the work vehicle 30. Therefore, it is possible to improve the technology to autonomously drive the work vehicle 30 on public roads.

The disclosure has been described based on the drawings and the embodiment, and it is noted that persons skilled in the art can make various modifications and alterations based on the disclosure. Therefore, it should be noted that the scope of the disclosure encompasses these modifications and alterations. For example, the functions and the like included in the components, steps, or the like, may be rearranged without any logical contradiction, and a plurality of components, steps, or the like may be combined as one or each component, step, or the like may be divided.

As a modification, the components and operations of the information processing apparatus 20 may be distributed among a plurality of computers communicable to each other. Alternatively, part or all of the information processing apparatus 20 may be mounted on the vehicle 10 or an unmanned aircraft 50 (described later) as, for example, a towing device.

As a modification, when the control unit 21 of the information processing apparatus 20 detects that an index indicating instability of follow-up travel that the work vehicle 30 follows the vehicle 10 is greater than or equal to a predetermined threshold, the control unit 21 may send a stop command to stop the work vehicle 30 at that location or a stop command to stop the work vehicle 30 after driving the work vehicle 30 in limp home mode, to the work vehicle 30 via the communication unit 22. Specifically, when the control unit 21 of the information processing apparatus 20 detects that, for example, an index indicating the degree of spin, drift out, or the like of the work vehicle 30, which can be acquired from the work vehicle 30 via the communication unit 22, is greater than or equal to a predetermined threshold, the control unit 21 generates a stop command to stop the work vehicle 30 at that location or a stop command to stop the work vehicle 30 after driving the work vehicle 30 in limp home mode. The control unit 21 of the information processing apparatus 20 sends the generated stop command to the work vehicle 30 via the communication unit 22. The control unit 21 of the information processing apparatus 20 sends again the follow-up command to perform follow-up travel to follow the vehicle 10 to the work vehicle 30 via the communication unit 22 after a lapse of a predetermined period of time from when the work vehicle 30 has stopped. Except these configurations, the description of the above-described embodiment applies. The limp home mode may include a mode in which the work vehicle 30 is caused to move to a predetermined safety zone or the like by using a selected driving assistance technology. According to this modification, even when the limp home mode of the work vehicle 30 temporarily becomes instable because of the fact that the follow-up command is not sent due to the instability or the like of the network 40, it is possible to ensure safety.

Figure 6:
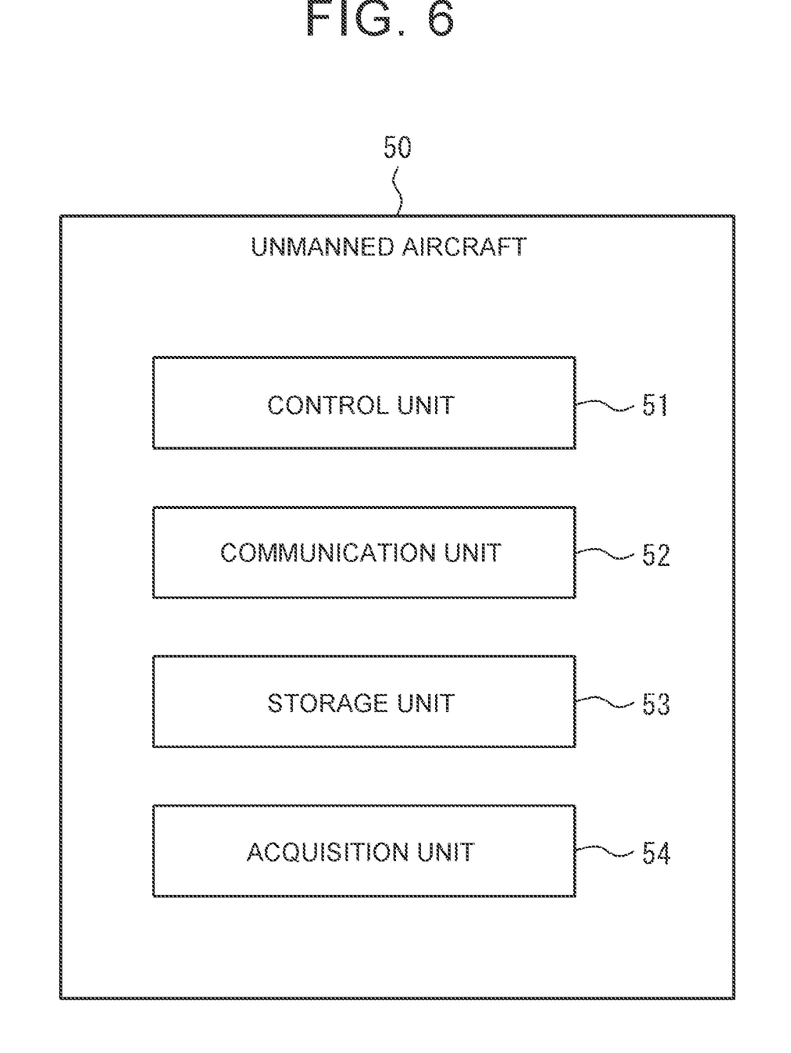
FIG. 6 is a block diagram showing the schematic configuration of an unmanned aircraft according to a modification of the disclosure.

As a modification, instead of the vehicle 10 with an autonomous driving function, the unmanned aircraft 50, such as a drone, may lead the work vehicle 30. In this modification, the control unit 21 of the information processing apparatus 20 generates a follow-up command to perform follow-up travel to follow the unmanned aircraft 50. The control unit 21 of the information processing apparatus 20 sends the generated follow-up command to the work vehicle 30 with a follow-up travel function via the communication unit 22. For the specific operation of the information processing apparatus 20, except that the unmanned aircraft 50 instead of the vehicle 10 leads the work vehicle 30 and the flight route of the unmanned aircraft 50 is selected instead of the travel route of the vehicle 10, the description of the flowchart shown in FIG. 5 applies. As shown in FIG. 6, the unmanned aircraft 50 according to this modification includes a control unit 51, a communication unit 52, a storage unit 53, and an acquisition unit 54. Except that the control unit 51 executes flight control of the unmanned aircraft 50, the description of the units in the above-described embodiment applies. According to this modification, for example, when the control unit 51 of the unmanned aircraft 50 detects interruption of another vehicle into between the unmanned aircraft 50 and the work vehicle 30 via the acquisition unit 54, the control unit 51 is able to execute flight control to cause the host aircraft 50 to move to behind the another vehicle. When the control unit 51 of the unmanned aircraft 50 detects an abnormality around the work vehicle 30 from an image acquired by the camera or the like in the work vehicle 30 for farm work or the like and acquired via the communication unit 52, the control unit 51 is able to execute flight control to move the unmanned aircraft 50 to around the work vehicle 30 for checking a current location.

As a modification, a general-purpose computer may be configured to function as the information processing apparatus 20 according to the above-described embodiment. Specifically, a program describing the process details to implement the functions of the information processing apparatus 20 according to the above-described embodiment is stored in a memory of a general-purpose computer, and the program is read and run by the processor. The disclosure may be implemented by a program executable by a processor or a non-transitory computer-readable medium storing the program.

What is claimed is:

1. An information processing apparatus comprising a processor configured to:
    generate a follow-up command to perform follow-up travel to follow an autonomous vehicle with an autonomous driving function or an unmanned aircraft;
    send the follow-up command to a work vehicle with a follow-up travel function;
    send a first stop command to the work vehicle when the processor determines that an obstacle is present around the work vehicle; and
    send the follow-up command again to the work vehicle after a predetermined period lapses from a time that the work vehicle stops, wherein
    the first stop command is a command to stop the work vehicle at a current location.

2. The information processing apparatus according to claim 1, wherein:
    the processor is configured to detect whether an index indicating instability of the follow-up travel is greater than or equal to a predetermined threshold;
    the processor is configured to send the first stop command or a second stop command to the work vehicle when the processor detects that the index is greater than or equal to the predetermined threshold;
    and
    the second stop command is a command to stop the work vehicle after driving the work vehicle in limp home mode.

3. The information processing apparatus according to claim 1, wherein the processor is configured to control notifying an area around the work vehicle that the work vehicle is performing follow-up travel.

4. The information processing apparatus according to claim 1, wherein the processor is configured to select a travel route of the autonomous vehicle or a flight route of the unmanned aircraft based on a size of the work vehicle.

5. The information processing apparatus according to claim 1, wherein:
    the processor is further configured to control a projector mounted on the autonomous vehicle to display an optical rope around the work vehicle, and
    the optical rope is a visual indication that the work vehicle is performing follow-up travel behind the autonomous vehicle.

6. An information processing method to be executed by an information processing apparatus, the information processing method comprising:
    generating a follow-up command to perform follow-up travel to follow an autonomous vehicle with an autonomous driving function or an unmanned aircraft;
    sending the follow-up command to a work vehicle with a follow-up travel function;
    sending a first stop command to the work vehicle when an obstacle is determined to be present around the work vehicle; and
    sending the follow-up command again to the work vehicle after a predetermined period lapses from a time that the work vehicle stops, wherein
    the first stop command is a command to stop the work vehicle at a current location.

7. The information processing method according to claim 6, further comprising sending the first stop command or a second stop command to the work vehicle when an index indicating that instability of the follow-up travel is greater than or equal to a predetermined threshold is detected, wherein
    the second stop command is a command to stop the work vehicle after driving the work vehicle in limp home mode.

8. The information processing method according to claim 6, further comprising controlling notifying an area around the work vehicle that the work vehicle is performing follow-up travel.

9. The information processing method according to claim 6, further comprising selecting a travel route of the autonomous vehicle or a flight route of the unmanned aircraft based on a size of the work vehicle.

10. A non-transitory storage medium storing instructions that are executable on one or more processors in a computer and that cause the one or more processors to perform functions, the functions comprising:
    generating a follow-up command to perform follow-up travel to follow an autonomous vehicle with an autonomous driving function or an unmanned aircraft;
    sending the follow-up command to a work vehicle with a follow-up travel function;
    sending a first stop command to the work vehicle when the one or more processors determine that an obstacle is present around the work vehicle; and
    sending the follow-up command again to the work vehicle after a predetermined period lapses from a time that the work vehicle stops, wherein
    the first stop command is a command to stop the work vehicle at a current location.

11. The non-transitory storage medium according to claim 10, the functions further comprising sending the first stop command or a second stop command to the work vehicle when an index indicating that instability of the follow-up travel is greater than or equal to a predetermined threshold is detected, wherein
    the second stop command is a command to stop the work vehicle after driving the work vehicle in limp home mode.

12. The non-transitory storage medium according to claim 10, the functions further comprising controlling notifying an area around the work vehicle that the work vehicle is performing follow-up travel.

* * * * *